(12) United States Patent
Shi (10) Patent No.: US 8,625,617 B2
(45) Date of Patent: Jan. 7, 2014

(54) METHOD, APPARATUS, AND SYSTEM FOR UPDATING PACKET DATA NETWORK GATEWAY INFORMATION

(75) Inventor: Shufeng Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 156 days.

(21) Appl. No.: 13/190,272

(22) Filed: Jul. 25, 2011

(65) Prior Publication Data

US 2011/0280254 A1    Nov. 17, 2011

Related U.S. Application Data

(63) Continuation of application No. PCT/CN2010/070282, filed on Jan. 20, 2010.

(30) Foreign Application Priority Data

Jan. 23, 2009    (CN) .......................... 2009 1 0001167

(51) Int. Cl.
H04L 12/28    (2006.01)

(52) U.S. Cl.
USPC ........................................................ 370/401

(58) Field of Classification Search
USPC ................... 370/401, 395.3, 395.31, 395.32
See application file for complete search history.

(56) References Cited

U.S. PATENT DOCUMENTS

| | | | |
|---|---|---|---|
| 2005/0053070 A1 | 3/2005 | Jouppi | |
| 2005/0064889 A1* | 3/2005 | Haumont | 455/514 |
| 2006/0262736 A1* | 11/2006 | Dong et al. | 370/254 |
| 2008/0254768 A1* | 10/2008 | Faccin | 455/411 |
| 2008/0274736 A1* | 11/2008 | Hu | 455/433 |
| 2010/0323700 A1* | 12/2010 | Bachmann et al. | 455/436 |
| 2011/0176510 A1* | 7/2011 | Hallenstal et al. | 370/331 |

FOREIGN PATENT DOCUMENTS

| | | |
|---|---|---|
| CN | 101094443 A | 12/2007 |
| CN | 101106810 A | 1/2008 |
| CN | 101135987 A | 3/2008 |
| CN | 101330740 A | 12/2008 |
| CN | 101388828 A | 3/2009 |
| JP | 2002-513236 A | 5/2002 |

OTHER PUBLICATIONS

International Search Report in corresponding PCT Application No. PCT/CN2010/070282 (Apr. 29, 2010).

1st Office Action in corresponding Chinese Application No. 200910001167.9 (Jun. 20, 2011).

(Continued)

Primary Examiner — Chi Pham
Assistant Examiner — Fahmida Chowdhury
(74) Attorney, Agent, or Firm — Leydig, Voit & Mayer, Ltd.

(57) ABSTRACT

A method, an apparatus, and a system for updating packet data network gateway (PDN GW) information are disclosed. The method includes: receiving, by a home subscriber server (HSS), an update request sent by a first network element (NE), where the update request includes a Context-Identifier parameter and an international mobile subscriber identity (IMSI); and updating PDN GW information according to the Context-Identifier parameter and the IMSI. With embodiments of the present invention, the data matching speed is increased in the update process, and the performance of the HSS is improved.

7 Claims, 4 Drawing Sheets

(56) References Cited

OTHER PUBLICATIONS

Written Opinion of the International Searching Authority in corresponding PCT Application No. PCT/CN2010/070282 (Apr. 29, 2010).

"3GPP TS 29.272—3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," Jan. 2009, Version 8.1.1, $3^{rd}$ Generation Partnership Project, Valbonne, France.

"3GPP TS 29.273—3rd Generation Partnership Project; Technical Specification Group Core Network and Terminals; Evolved Packet System (EPS); 3GPP EPS AAA interfaces (Release 8)," Dec. 2008, Version 8.0.0, $3^{rd}$ Generation Partnership Project, Valbonne, France.

\* cited by examiner

METHOD, APPARATUS, AND SYSTEM FOR UPDATING PACKET DATA NETWORK GATEWAY INFORMATION

CROSS-REFERENCE TO RELATED APPLICATIONS

This application is a continuation of International Application No. PCT/CN2010/070282, filed on Jan. 20, 2010, which claims priority to Chinese Patent Application No. 200910001167.9, filed on Jan. 23, 2009, both of which are hereby incorporated by reference in their entireties.

FIELD OF THE INVENTION

The present invention relates to communication technologies, and in particular, to a method, an apparatus, and a system for updating packet data network gateway (PDN GW) information.

BACKGROUND OF THE INVENTION

An evolved packet system (EPS) may include a mobility management entity (MME). The MME is responsible for the mobility management of a control plane and is configured to manage user contexts and mobility status and allocate a temporary identity to a user. A home subscriber server (HSS) may include a home subscriber server (HSS) and/or a home location register (HLR). The HSS is configured to store subscription information for users. A PDN GW is a user plane anchor between a 3rd Generation Partnership Project (3GPP) access system and a non-3GPP access system and is also an interface for terminating the connection with an external packet data network (PDN). The core network of the EPS supports not only the access of a user equipment (UE) that uses a 3GPP access technology but also the access of a UE that uses non-3GPP technologies, such as wireless local area network (WLAN), code division multiple access (CDMA), and worldwide interoperability for microwave access (WiMAX). The access authentication and authorization of the UEs that use non-3GPP technologies are implemented by a 3GPP, authorization, authentication, and accounting (AAA) server. After receiving a non-3GPP access request from a UE, the AAA server obtains subscription data of the user from the HSS; after authenticated and authorized, by the AAA server, the UE is allowed to access the EPS network.

In the EPS, the network allocates a PDN GW to a PDN connection that is directed to an access point name (APN) and initiated by the UE. The PDN GW information may be subscribed statically or generated dynamically and stored on the HSS. The PDN GW information is used to provide signaling and bearer handover anchors for the UE to perform handover between the 3GPP access and the non-3GPP access.

When the PDN GW information generated dynamically is changed, the serving GPRS support node (SGSN), the MME and/or the AAA server updates the PDN GW information stored on the HSS. In the conventional art, the process of updating the PDN GW information includes: When the network re-selects a PDN GW for the PDN connection of the UE, the MME, the SGSN, and/or the AAA server needs to update the PDN GW information stored on the HSS; or when the PDN connection of the UE is released or detached from the network, the MME, the SGSN, and/or the AAA server needs to delete the PDN GW information stored on the HSS. The MME, the SGSN, and/or the AAA server sends an update request that carries corresponding APN information to the HSS; the HSS finds a corresponding record through the APN, and updates the PDN GW information in the record of the HSS by checking whether a PDN GW parameter is carried in the update request.

From the preceding process, it can be inferred that an international mobile subscriber identity (IMSI) of the user and an APN corresponding to a PDN GW to be updated are carried in the update request that the MME, the SGSN, and/or the AAA server sends to the HSS. After receiving the update request, the HSS finds a corresponding PDN GW according to the IMSI and the APN, and updates the PDN GW. However, an APN parameter is a character string and includes a 63-byte string like "Label1.Label2.Label3". Therefore, the speed of matching the searched subscription data of the user by the HSS according to the APN parameter is lower. In addition, the MME, the SGSN, and/or the AAA server updates the PDN GW information on the HSS in many cases. Therefore, frequent update operations are performed, thus affecting the performance of the HSS.

SUMMARY OF THE INVENTION

Embodiments of the present invention provide a method, an apparatus, and a system for updating PDN GW information to solve the problem in the prior art that the performance of an HSS is reduced due to data matching at a lower speed in the process of updating the PDN GW information.

To solve the preceding technical problem, a method for updating PDN GW information provided in an embodiment of the present invention includes:

receiving an update request sent by a first network element (NE), where the update request includes a Context-Identifier parameter and an IMSI; and updating corresponding PDN GW information according to the Context-Identifier parameter and the IMSI.

An apparatus for updating PDN GW information provided in an embodiment of the present invention includes:

a receiving module, configured to receive an update request from an NE, where the update request includes a Context-Identifier parameter and an IMSI; and an updating module, configured to update corresponding PDN GW information according to the Context-Identifier parameter and the IMSI.

A system for updating PDN GW information provided in an embodiment of the present invention includes:

a first NE, configured to send an update request to a second NE, where the update request includes a Context-Identifier parameter and an IMSI; and the second NE, configured to receive the update request, and update corresponding PDN GW information according to the Context-Identifier parameter and the IMSI in the update request.

Embodiments of the present invention have the following advantages:

In embodiments of the present invention, a NE carries a Context-Identifier parameter in an update request, and sends the update request that carries the Context-Identifier parameter to an HSS, so that the HSS updates PDN GW information according to the update request. Obviously, the HSS can perform the update process according to the Context-Identifier parameter carried in the update request. The Context-Identifier parameter is an integer. Therefore, the data matching speed may be greatly increased in the update process, and the performance of the HSS may be improved.

BRIEF DESCRIPTION OF THE DRAWINGS

To make embodiments of the present invention or the technical solution in the prior art clearer, the accompanying drawings for illustrating the embodiments of the present invention or the prior art are described in the following. Obviously, the accompanying drawings are merely exemplary, and those skilled in the art may also derive other drawings from such accompanying drawings without creative efforts.

DETAILED DESCRIPTION OF THE EMBODIMENTS

The technical solution of the present invention is described in detail in the following with reference to accompanying drawings in embodiments of the present invention. Obviously, the embodiments are merely exemplary, and the present invention is not limited to such embodiments. Those skilled in the art may derive other embodiments from the embodiments described herein without making any creative effort, and all such other embodiments shall fall within the protection scope of the present invention.

For a better understanding of the preceding objective, feature, and merits of the present invention, the present invention is described in detail in the following with reference to exemplary embodiments and accompanying drawings.

Figure 1:
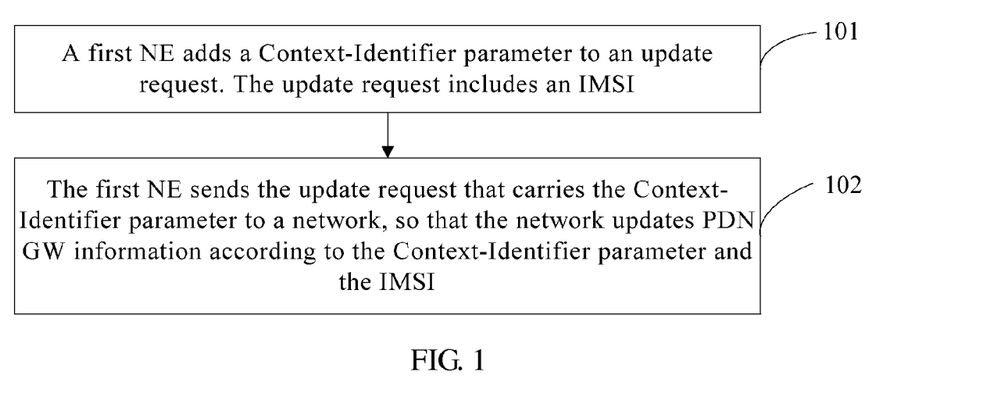
FIG. 1 is a flowchart showing a method for updating PDN GW information according to a first embodiment of the present invention.

As shown in FIG. 1, a method for updating PDN GW information provided in a first embodiment of the present invention may include the following steps:

Step 101: A first NE carries a Context-Identifier parameter in an update request. The update request includes an IMSI.

It should be noted that the first NE may be a Mobility Management Entity (MME), a Serving GPRS Support Node (SGSN), and/or an authorization, authentication, and accounting (AAA) server. The update request sent by the MME and/or the SGSN may be a Notify request. The update request sent by the AAA server may be a Non-3GPP IP Registration request. The first NE may carry a Context-Identifier parameter by extending a Notify request or a Registration request.

Step 102: The first NE sends the update request that carries the Context-Identifier parameter to a second NE, so that the second NE updates PDN GW information according to the Context-Identifier parameter and the IMSI.

The second NE may be an HSS or may include an HSS and/or an HLR. The update request includes a user name that carries an IMSI of the user. The operation of updating PDN GW information may include adding, deleting, and/or modifying PDN GW information. The update request may further include a PDN GW identity parameter. The PND GW identity parameter is used to notify the HSS that the network selects new PDN GW information for a PDN connection corresponding to an APN, where the PDN GW identity parameter may identify the new PDN GW information. It should be noted that when the update request is used to delete PDN GW information corresponding to an APN on the HSS, the update request does not include a PDN GW identity parameter.

The first NE sends an update request that carries a Context-Identifier parameter to an HSS. The HSS may update PDN GW information according to the Context-Identifier parameter and the IMSI in the update request. The PDN GW information may include an Internet Protocol (IP) address of the PDN GW or a fully qualified domain name (FQDN) identity of the PDN GW.

In the first embodiment of the present invention, the first NE adds a Context-Identifier parameter to an update request, and sends the update request with the Context-Identifier parameter to an HSS, so that the HSS can update PDN GW information according to the Context-Identifier parameter, where the Context-Identifier parameter is an integer. Compared with the prior art where updating is performed according to string data, this method simplifies the matching in the update process performed by the HSS, so that the data matching speed in the update process is increased and the performance of the HSS is improved.

Figure 2:
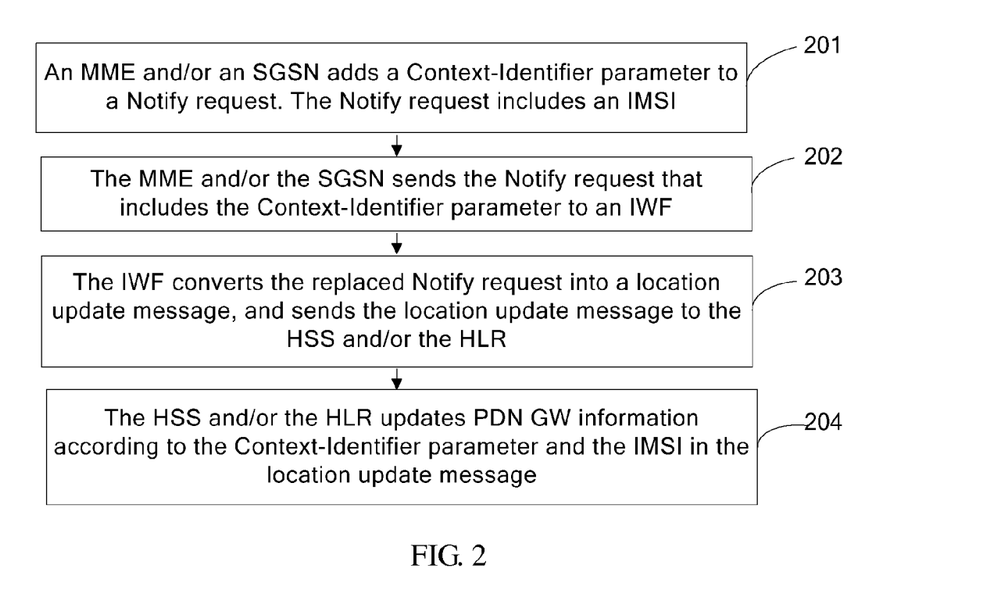
FIG. 2 is a flowchart showing a method for updating PDN GW information according to a second embodiment of the present invention.

As shown in FIG. 2, a method for updating PDN GW information provided in a second embodiment of the present invention may include the following steps:

Step 201: An MME and/or An SGSN adds a Context-Identifier parameter to a Notify Request. The Notify request includes an IMSI.

In this embodiment, the first NE may be an MME and/or an SGSN. In practice, some contents of the Notify request that includes the Context-Identifier parameter are shown in Table 1.

TABLE 1

| Parameter Name | Parameter Description |
|---|---|
| User Name | Includes an IMSI of a user. |
| PDN GW Identity | Notifies the HSS that the network selects new PDN GW information for a PDN connection corresponding to an APN. The PDN GW identity parameter may identify the new PDN GW information. When instructing the HSS to delete PDN GW information corresponding to an APN, this parameter must be unavailable. |

TABLE 1-continued

| Parameter Name | Parameter Description |
|---|---|
| Context Identifier | Includes a context identifier mapping with an APN corresponding to the PDN GW to be operated.<br>When the PDN GW information is updated or deleted, this parameter must be available and correspond to an APN corresponding to the PDN GW to be updated or to be deleted. |

The Context-Identifier parameter is an integer value and uniquely identifies an APN configuration in each piece of subscription data of the user on the HSS. A practical example of the Context-Identifier parameter is shown as follows:

```
APN-Configuration::=  <AVP header: XXX XXXX>
                      { Context-Identifier }
                      * 2 [ Served-Party-IP-Address ]
                      { PDN-Type }
                      { Service-Selection}
                      [ EPS-Subscribed-QoS Profile ]
                      [ VPLMN-Dynamic-Address-Allowed ]
                      [ MIP6-Agent-Info ]
                      [ PDN-GW-Allocation-Type ]
                      [ 3GPP-Charging-Characteristics ]
                      [ AMBR ]
                      *[ AVP ]
```

Step 202: The MME and/or the SGSN sends the Notify request that includes the Context-Identifier parameter to an IWF.

Figure 3:
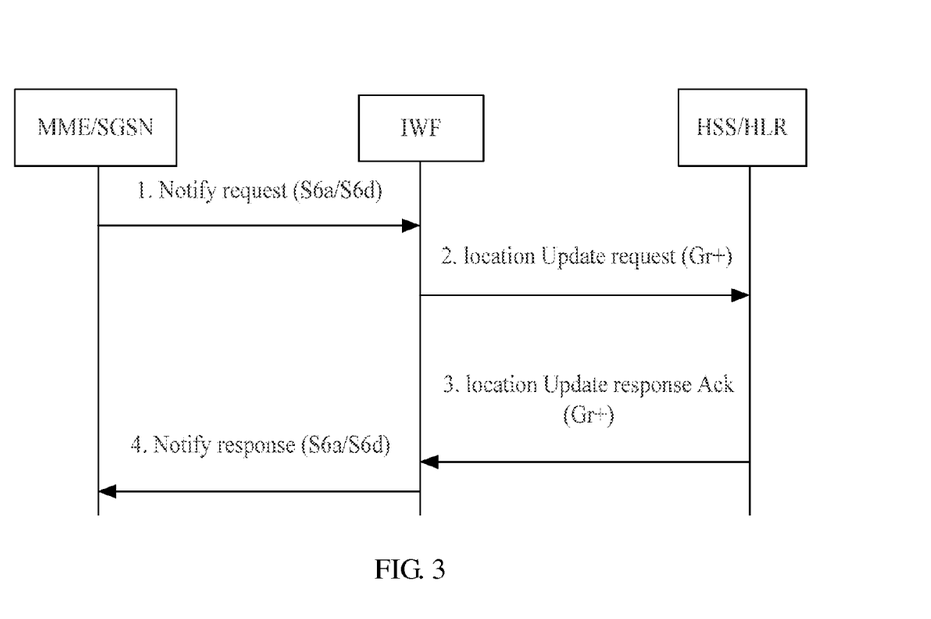
FIG. 3 is a schematic diagram showing a connection after an interworking function (IWF) is added to the method for updating PDN GW information in the second embodiment.

In the network evolution process, the EPS and the GPRS network may coexist for a period of time. An S6a interface between the MME and the HSS on the EPS network uses the Diameter protocol, while a Gr/Gr+ interface between the SGSN and the HSS and/or the HLR on the GPRS network uses the Mobile Application Part (MAP) protocol. To enable a GPRS user to roam to the EPS network and access services without affecting the GPRS network, an IWF may be added between the MME and/or the SGSN and the HSS/HLR that supports only the Gr/Gr+interface. A schematic diagram of the connection is shown in FIG. 3.

The IWF is used for protocol conversion between the MAP-based Gr interface and the Diameter-based S6a interface. When a user on the GPRS network roams to the EPS network, the NE may download the subscription data of the user from the old HSS and/or the HLR through the IWF and register the location, and then process subsequent services. The IWF may also be set between the SGSN that supports the Diameter-based S6d interface and the HSS and/or the HLR to perform the protocol conversion between the MAP-based Gr interface and the Diameter-based S6a interface.

Step 203: The IWF converts the Notify request that includes the Context Identifier parameter into a location update message, and sends the location update message to the HSS and/or the HLR.

Specifically, the IWF converts the Notify request that includes the Context Identifier parameter into a location update message based on the MAP Protocol, and sends the location update message to the HSS and/or the HLR.

Step 204: The HSS and/or the HLR updates PDN GW information according to the Context-Identifier parameter and the IMSI in the location update message.

After step 204, the step may further include: the HSS and/or the HLR returns a location update response based on the MAP protocol to the IWF; the IWF converts the location update response into a Notify response based on the Diameter protocol, and sends the Notify response to the MME and/or the SGSN.

In this embodiment, the IWF is performed between the MME and/or the SGSN and the HSS and/or the HLR. In this way, the method provided in this embodiment may also be applicable to a scenario where the EPS interworks with the HSS and/or the HLR that does not support the S6a interface or the S6d interface on the Rel-8 network. This may simplify the process of updating the PDN GW information in that scenario and improve the performance of the HSS and/or the HLR.

Figure 4:
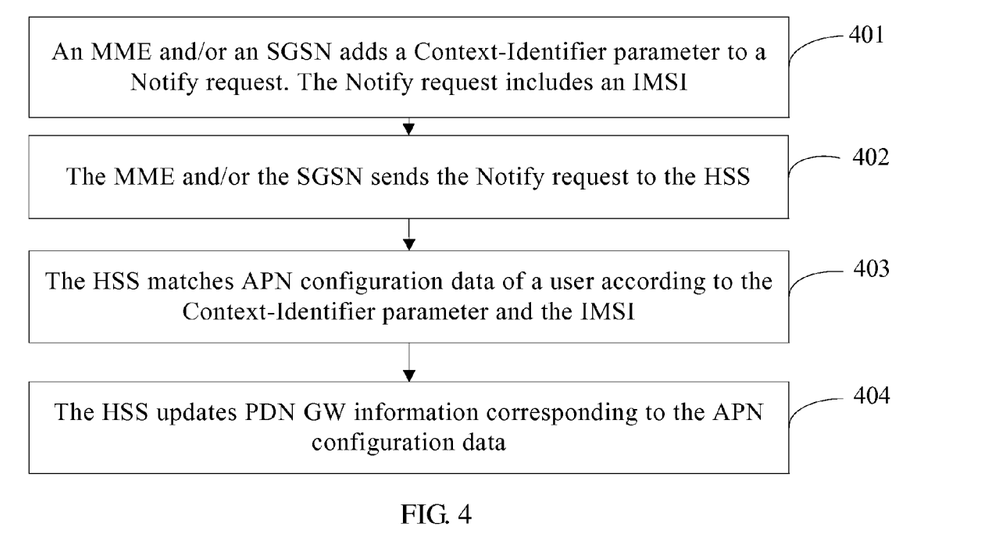
FIG. 4 is a flowchart showing a method for updating PDN GW information according to a third embodiment of the present invention.

As shown in FIG. 4, a method for updating PDN GW provided in a third embodiment of the present invention may include the following steps:

Step 401: An MME and/or an SGSN adds a Context-Identifier parameter to a Notify Request. The Notify request includes an IMSI.

In this embodiment, the first NE may be an MME and/or an SGSN; the second NE is an HSS; and the Context-Identifier parameter is an integer value and uniquely identifies an APN configuration in each piece of subscription data of the user on the HSS.

Step 402: The MME and/or the SGSN sends the Notify request that includes the Context-Identifier parameter to the HSS.

Step 403: The HSS matches APN configuration data of a user according to the Context-Identifier parameter and the IMSI.

The HSS may match APN configuration data of a user in the subscription data of the user stored on the HSS according to the Context-Identifier parameter and the IMSI. The APN configuration data may include a Context-Identifier parameter, an IMSI and/or an APN parameter.

Step 404: The HSS updates the PDN GW information corresponding to the APN configuration data.

After step 404, the step may further include: the HSS returns an update response to the MME and/or the SGSN. According to the method provided in this embodiment, the subscription data is matched according to the Context-Identifier parameter that is an integral value. In this way, the data matching speed is increased, and the performance of the HSS is improved.

Figure 5:
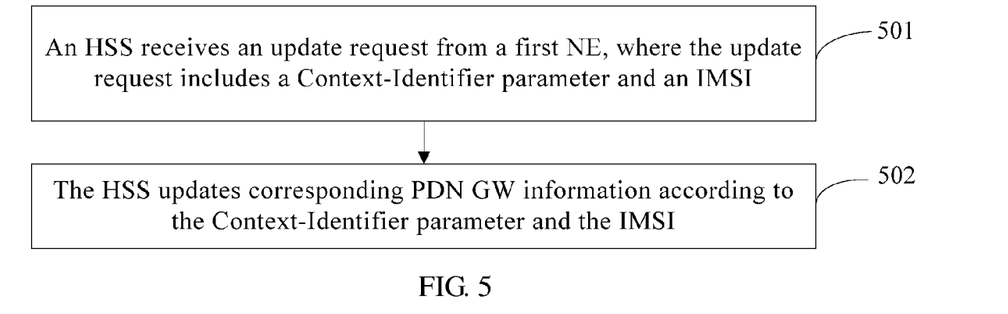
FIG. 5 is a flowchart showing a method for updating PDN GW information according to a fourth embodiment of the present invention.

As shown in FIG. 5, a method for updating PDN GW provided in a fourth embodiment of the present invention may include the following steps:

Step 501: An HSS receives an update request from a first NE, where the update request includes a Context-Identifier parameter and an IMSI.

The first NE may be an MME, an SGSN and/or an AAA server. The HSS is a second NE and may include an HSS and/or an HLR. The update request may be a Registration request and/or a Notify request. The update operation may include addition, modification and/or deletion. The update request may further include a PDN GW identity parameter. The PDN GW identity parameter may be used to notify the HSS and/or the HLR that the network selects new PDN GW information for a PDN connection of an APN, where the PDN GW identity parameter may identify the new PDN GW information. It should be noted that when the update request is used to request the HSS and/or the HLR to delete PDN GW information corresponding to an APN, the update request does not include a PDN GW identity parameter.

In a practical example, the Registration request may include some parameters shown in Table 2.

TABLE 2

| Parameter Name | Parameter Description |
| --- | --- |
| Permanent User Identity | Includes an IMSI of a user. |
| Server Assignment Type | Is set to PGW_UPDATE and used to update PDN GW information. |
| PGW identity | Notifies the HSS that the network selects new PDN GW information for a PDN connection corresponding to an APN. The PDN GW identity parameter may identify the new PDN GW information. When instructing the HSS to delete PDN GW information corresponding to an APN, this parameter must be unavailable. |
| Context Identifier | Includes a context identifier mapping with an APN that corresponds to the PDN GW to be operated. When the Server Assignment Type is set to PGW_UPDATE, that is, when PDN GW information is updated or deleted, this parameter must be available and correspond to an APN corresponding to the PDN GW to be operated or to be deleted. |

It should be noted that the HSS may receive a Notify request sent by the MME and/or the SGSN through an IWF; after the MME and/or the SGSN sends the Notify request to the IWF, the IWF converts the Notify request into a location update message based on the MAP protocol, and sends the location update message to the HSS and/or the HLR to prepare for updating PDN GW information by the HSS and/or the HLR.

Step 502: The HSS updates corresponding PDN GW information according to the Context-Identifier parameter and the IMSI.

When the HSS receives a Notify request sent by the MME and/or the SGSN through the IWF in step 501, the HSS updates corresponding PDN GW information according to the location update message.

After step 502, the step may further include: the HSS and/or the HLR returns a location update response based on the MAP to the IWF; the IWF converts the location update response into a Notify response based on the Diameter protocol, and sends the Notify response to the MME and/or the SGSN.

In this embodiment, the HSS may match a corresponding PDN GW according to the Context-Identifier parameter and the IMSI, and update the PDN GW information, where the PDN GW information may include the IP address or FQDN identity of the PDN GW. The HSS receives an update request that includes a Context-Identifier parameter and an IMSI, so that the HSS can match, obtain, and update the PGN GW information according to the Context-Identifier parameter, where the Context-Identifier parameter is an integer. The matching and updating are performed according to the integer data, so that the data matching speed in the update process is increased and the performance of the HSS is improved.

Figure 6:
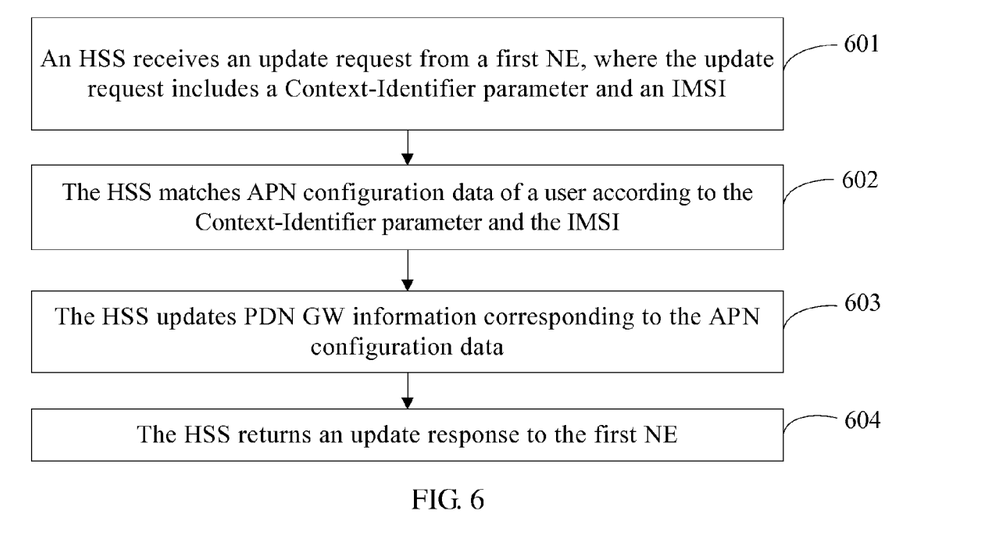
FIG. 6 is a flowchart showing a method for updating PDN GW information according to a fifth embodiment of the present invention.

As shown in FIG. 6, a method for updating PDN GW information provided in a fifth embodiment of the present invention may include the following steps:

Step 601: An HSS receives an update request from a first NE, where the update request includes a Context-Identifier parameter and an IMSI.

In this embodiment, the second NE is the HSS, and the first NE may be an MME, an SGSN, and/or an AAA server.

Step 602: The HSS matches APN configuration data of a user according to the Context-Identifier parameter and the IMSI.

After receiving an update request, the HSS may use the Context-Identifier parameter and the IMSI in the update request as an index to search a database for the stored subscription data of the user, and match the corresponding APN configuration data of the user.

Step 603: The HSS updates the PDN GW information corresponding to the APN configuration data.

The APN configuration data is mapping with the PDN GW. The HSS may directly update the PDN GW information corresponding to the APN configuration data.

Specifically, this step may include the following sub-steps:

Sub-step A1: The HSS matches APN configuration data of a user according to the Context-Identifier parameter and the IMSI.

Sub-step A2: The HSS updates the PDN GW information corresponding to the APN configuration data.

The HSS may match the APN configuration data of the user stored on the HSS according to the Context-Identifier parameter and the IMSI, and then update the PDN GW information corresponding to the APN configuration data.

Step 604: The HSS returns an update response to the first NE.

After updating the PDN GW information, the HSS returns an update response to the first NE, where the update response may be a Notify response or a Registration response.

It should be noted that for a better description of the methods provided in the preceding embodiments of the present invention, the methods are described as a series of actions. It is understandable to those skilled in the art that the present invention is not limited by the sequence of the actions. Some steps may be carried out in other sequence or simultaneously according to the present invention. In addition, it is understandable to those skilled in the art that the embodiments in the specification are exemplary embodiments and that the actions and modules involved in these embodiments are not mandatory for the present invention.

Figure 7:
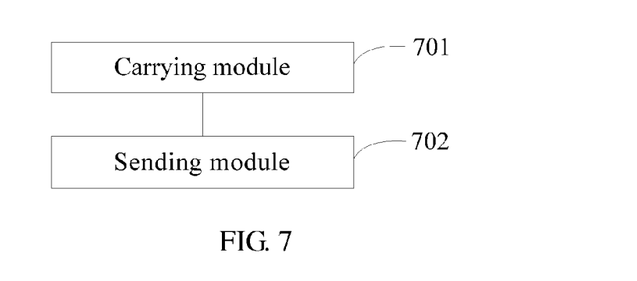
FIG. 7 is a schematic diagram showing a structure of an apparatus for updating PDN GW information according to the first embodiment of the present invention.

Corresponding to the method provided in the preceding embodiments, as shown in FIG. 7, an apparatus for updating PDN GW information provided in the first embodiment of the invention may include a carrying module 701 and a sending module 702.

The carrying module 701 is configured to add a Context-Identifier parameter to an update request. The update request includes an IMSI.

The Context-Identifier parameter is an integer. The update request may be a Registration request or a Notify request. The update request includes the IMSI and a PDN GW parameter.

The sending module 702 is configured to send the update request that includes the Context-Identifier parameter to an HSS, so that the HSS updates PDN GW information according to the Context-Identifier parameter and the IMSI.

It should be noted that the update operation may include addition, deletion and/or modification. The HSS is a second NE and may include an HSS and/or an HLR. The sending module 702 may be further configured to send a replaced update request to an IWF, so that the IWF converts the Notify request into a location update request and sends the location update request to the HSS. In this way, the HSS may update PDN GW information according to the location update message. The apparatus may be integrated into the NE or directly implemented by the NE.

In this embodiment, the carrying module 701 replaces an APN parameter in an update request with a Context-Identifier parameter; the sending module 702 sends the replaced update request to the HSS, so that the HSS can update PDN GW information according to the Context-Identifier parameter, where the Context-Identifier parameter is an integer. Compared with the prior art where updating is performed according to string data, this apparatus described in this embodiment may simplify the matching in the update process performed by the HSS, so that the update process is simplified and the performance of the HSS is improved.

Figure 8:
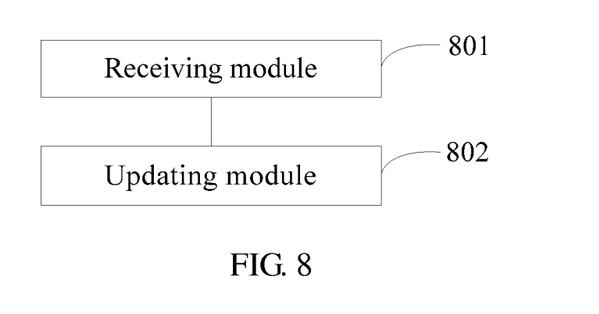
FIG. 8 is a schematic diagram showing a structure of an apparatus for updating PDN GW information according to the second embodiment of the present invention.

Corresponding to the method provided in the third embodiment, FIG. 8 is a schematic diagram showing a structure of an apparatus for updating PDN GW information according to the second embodiment of the present invention. The apparatus may include a receiving module 801 and an updating module 802.

The receiving module 801 is configured to receive an update request sent by a first NE, where the update request includes a Context-Identifier parameter and an IMSI.

The first NE may be an MME, an SGSN, and/or an AAA server. The update request may be a Notify request and/or a Registration request. The second NE is the HSS. The update request may include a PDN GW identity parameter. The PND GW identity parameter may be used to notify the HSS that the network selects new PDN GW information for an APN. It should be noted that when the update request is used to request the HSS to delete PDN GW information corresponding to an APN, the update request does not include a PDN GW identity parameter.

The updating module 802 is configured to update corresponding PDN GW information according to the Context-Identifier parameter and the IMSI.

In this embodiment, the update request received by a receiving module 901 includes a Context-Identifier parameter and an IMSI. The updating module matches a corresponding PDN GW according to the Context-Identifier parameter and the IMSI, and updates PDN GW information. The PDN GW information may include the IP address or the FQDN identity of the PDN GW. By using the apparatus provided in this embodiment, in the process of updating PDN GW information, the PDN GW information may be matched, obtained, and updated according to a Context-Identifier parameter. The Context-Identifier parameter is an integer. The matching and updating are performed according to the integer data, so that the update process is simplified and the performance of the HSS is improved.

Figure 9:
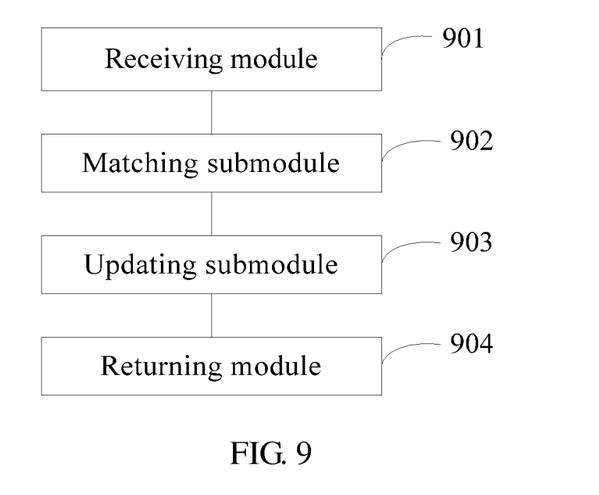
FIG. 9 is a schematic diagram showing a structure of an apparatus for updating PDN GW information according to the third embodiment of the present invention.

Corresponding to the method provided in the fourth embodiment, FIG. 9 is a schematic diagram showing a structure of an apparatus for updating PDN GW information according to the third embodiment of the present invention. The apparatus may include:

the receiving module 901, configured to receive an update request sent by a first NE through an IWF, where the update request includes a Context-Identifier parameter and an IMSI;

a matching submodule 902, configured to match APN configuration data of a user according to the Context-Identifier parameter and the IMSI;

an updating submodule 903, configured to update the PDN GW information corresponding to the APN configuration data; and a returning module 904, configured to return an update response to the first NE.

In this embodiment, the apparatus may be implemented by an HSS or an HLR and may also be integrated into the HSS or the HLR. The update response may be a Notify response and/or a Registration response. Specifically, the matching submodule 902 matches APN configuration data of a user according to the Context-Identifier parameter and the IMSI; and then the updating submodule 903 updates the PDN GW information corresponding to the APN configuration data; and the returning module 904 returns an update response to the NE. In this way, the process of updating PDN GW information is simplified, and the performance of the HSS is improved.

Figure 10:
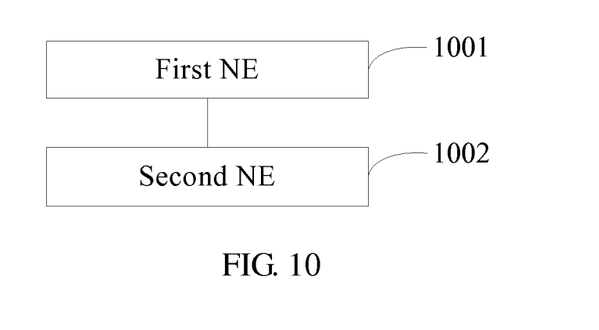
FIG. 10 is a schematic diagram showing a structure of a system for updating PDN GW information according to an embodiment of the present invention.

FIG. 10 is a schematic diagram showing a structure of a system for updating PDN GW information provided in an embodiment of the present invention. As shown in FIG. 10, the system may include:

a first NE 1001, configured to send an update request to a second NE 1002, where the update request includes a Context-Identifier parameter and an IMSI; and the second NE 1002, configured to update corresponding PDN GW information according to the Context-Identifier parameter and the IMSI in the update request.

The second NE 1002 may be integrated into the HSS and/or the HLR, and may include.

a receiving module, configured to receive an update request sent by the first NE, where the update request includes a Context-Identifier parameter and an IMSI; and an updating module, configured to update corresponding PDN GW information according to the Context-Identifier parameter and the IMSI.

It should be noted that the method and apparatus for updating PDN GW information are described in detail in the preceding, for detail information about the system for updating PDN GW information, see descriptions of the method and apparatus provided in the preceding embodiments.

It should be noted that in the specification, relational terms such as first and second are used only to differentiate an entity or operation from another entity or operation, and do not require or imply any actual relationship or sequence between these entities or operations. Furthermore, the terms such as "include", "comprise" or any other variation thereof, are intended to cover a non-exclusive inclusion, so that the process, method, article, or device including a series of elements includes not only these elements but also other unspecified elements, or further includes inherent elements of this process, method, article, or device. In the case of no further limitations, an element limited by "include one" does not exclude that the process, method, article, or device that includes the element also includes the same other elements.

A method, an apparatus, and a system for updating PDN GW information provided in embodiments of the present invention are described in detail. Although the principle and implementation of the invention are described through some exemplary embodiments, the embodiments are only used to help understand the method and idea of the present invention. Meanwhile, it is apparent that those skilled in the art can make various modifications and variations to the invention without departing from the spirit and scope of the invention. In conclusion, the content of the specification shall not be construed as a limitation to the present invention.

What is claimed is:

1. In a home subscriber server (HSS), a method for updating packet data network gateway (PDN GW) information, comprising:
   receiving an update request sent by a first network element (NE), wherein the update request comprises a Context-Identifier parameter and an international mobile subscriber identity (IMSI); wherein the first NE is any of the following: a mobility management entity (MME) and a serving GPRS support node (SGSN); wherein the Context-Identifier parameter is an integer; and
   matching access point name (APN) configuration data of a user according to the Context-Identifier parameter and the IMSI; and
   updating the PDN GW information corresponding to the APN configuration data.

2. The method of claim 1, the receiving the update request from the first NE comprises:
   receiving the update request from at least one of the MME and the SGSN through an interworking function (IWF).

3. The method of claim 1, wherein the update request comprises a Registration request or a Notify request.

4. An home subscriber server (HSS) for updating packet data network gateway (PDN GW) information, comprising:
   a receiving module, configured to receive an update request from a first network element (NE), wherein the update request comprises a Context-Identifier parameter and an international mobile subscriber identity (IMSI); wherein the first NE is any of the following:
   a mobility management entity (MME) and a serving GPRS support node (SGSN); wherein the Context-Identifier parameter is an integer; and
   an updating module, configured to update corresponding PDN GW information according to the Context-Identifier parameter and the IMSI;
   wherein the updating module comprises:
   a matching submodule, configured to match access point name (APN) configuration data of a user according to the Context-Identifier parameter and the IMSI; and
   an updating submodule, configured to update the PDN GW information corresponding to the APN configuration data.

5. The apparatus of claim 4, wherein the receiving module is further configured to receive the update request from the NE through an interworking function (IWF).

6. A system for updating packet data network gateway (PDN GW) information, comprising:
   a first network element (NE), configured to send an update request to a second NE, wherein the update request comprises a Context-Identifier parameter and an international mobile subscriber identity (IMSI); wherein the first NE is any of the following: a mobility management entity (MME) and a serving GPRS support node (SGSN); wherein the Context-Identifier parameter is an integer; wherein the second NE is a home subscriber server (HSS); and
   the second NE, configured to receive the update request, and match access point name (APN) configuration data of a user according to the Context-Identifier parameter and the IMSI in the update request, and update the PDN GW information corresponding to the APN configuration data.

7. The system of claim 6, wherein the first NE is further configured to send the update request to the second NE through an interworking function (IWF), wherein the update request comprises the Context-Identifier parameter and the IMSI.

* * * * *